United States Patent [19]

Dorsten

[11] Patent Number: 4,580,545

[45] Date of Patent: Apr. 8, 1986

[54] STONE SAWING STRAND

[75] Inventor: Victor A. Dorsten, Orange Park, Fla.

[73] Assignee: Florida Wire and Cable Company, Jacksonville, Fla.

[21] Appl. No.: 584,759

[22] Filed: Feb. 29, 1984

[51] Int. Cl.[4] ............................................. B28D 1/08
[52] U.S. Cl. ...................................... 125/21; 140/149
[58] Field of Search ...................... 57/210, 212, 215; 125/12, 21; 140/149

[56] References Cited

U.S. PATENT DOCUMENTS

| Re. 24,660 | 6/1959 | Dessureau et al. | |
| 1,306,636 | 6/1919 | Selby | 125/12 |
| 2,123,619 | 7/1938 | Wienholz | 125/21 |
| 2,876,761 | 3/1959 | Stevens . | |
| 3,128,799 | 4/1964 | Kerr | 140/149 |
| 3,150,470 | 9/1964 | Barron . | |
| 3,180,687 | 4/1965 | Horton . | |
| 3,257,792 | 6/1966 | Joy . | |
| 4,015,931 | 4/1977 | Thakur . | |
| 4,464,892 | 8/1984 | Kleijwegt | 57/212 |

FOREIGN PATENT DOCUMENTS

| 802784 | 9/1936 | France | 125/21 |
| 1160447 | 7/1958 | France . | |
| 2485794 | 10/1985 | France | 140/149 |
| 977536 | 11/1982 | U.S.S.R. | 57/212 |

OTHER PUBLICATIONS

1980 Edition of Barre Life, Published by the Barre Granite Association of Barre, Vermont, Article.

Primary Examiner—Harold D. Whitehead

[57] ABSTRACT

A stone sawing strand consists of a plurality of component wires twisted about their own axes in opposite directions, and wound together in a continuous unidirectional lay. The saw made from the strand is capable of cutting a straight kerf through the workpiece, despite the absence of lay reversal. Generally, the component wires will be of high carbon steel and of square cross-sectional configuration, and the strand can be produced at a high rate of speed on a bow stranding machine.

11 Claims, 3 Drawing Figures

STONE SAWING STRAND

BACKGROUND OF THE INVENTION

Stone sawing strand, or saw wire, is now widely used in quarries and finishing shops for cutting granite, marble, and other types of stone, to prepare it for use for building construction, for monuments, and the like. Normally, such strand will comprise two or three carbon steel wires helically twisted together. The strand is typically ⅛ to 9/32 inch in nominal diameter, with individual wire diameters of 0.064 to 0.144 inch, and it is commonly sold in lengths of as much as 20,000 feet. Conventional practice is to reverse the direction of the helical twist lay at a preselected interval, typically of 25, 50, or 75 feet; the reason for doing so is to maintain a straight kerf as the strand cuts through the stone.

The machine used in connection with such a saw may consist of two or more large diameter sheaves, arranged on parallel horizontal axes generally spaced 20 to 30 feet apart. To provide the saw, the strand is formed into a loop, such as by butt welding or bevel splice brazing the ends, and is mounted about the sheaves in circumferential grooves provided thereon. One of the sheaves is powered, and drives the saw in band saw fashion, typically at a speed of approximately 60 miles per hour.

The stone cutting operation is carried out by placing the stone work beneath the bottom straight section of the saw spanning the sheaves, and simultaneously moving both sheaves downwardly by energizing a downfeed mechanism of the machine, to cause the strand to cut on a vertical plane through the stone. An aqueous slurry of an abrasive material, such as silicon carbide, is continuously pumped to the cutting zone. The interstices of the strand carry the abrasive slurry through and against the cutting plane, to produce the primary cutting action; the slurry also serves to maintain the work and the sawing strand at relatively low temperatures. As a result of such operations, the strand of course wears, and must be periodically changed for maximum efficiency.

Commercially, stone sawing strand is conventionally manufactured from round, hard drawn, high carbon bright steel wire, using a tubular stranding machine. Briefly, in such a machine the wire is pulled from mounted bobbins through and along a revolving tube, to a closing die where the wires converge in helical configuration; the pitch of twisting or helical assembly is called the "lay length", and will generally range from ⅝ to 1½ inches. Pulling force is provided by a capstan or wheel located downstream of the closing die, and the capstan is mechanically linked to the rotating strander tube so that the ratio of twist per-unit-length of strand pulled can be precisely controlled. From the capstan, the strand is passed through straightener rolls to a wooden reel suitable for handling and shipment.

A tubular stranding machine is typically 30 to 40 inches in diameter, 12 to 18 feet long, and of several thousand pounds mass. Because most sawing strand is produced with reverse lay direction, the stranding machine must constantly accelerate from zero speed to about 300 revolutions per minute, run for a time at that speed, decelerate to zero, reverse direction, and repeat the cycle; a typical cycle is 2½ to 3½ minutes, and gross machine output will generally be approximately 1,200 feet per hour. Such repetitive cycling, and reversal of movement of the large masses involved, necessarily involve large inertial forces and create much wasted energy and loss of efficiency. Machinery maintenance costs are also high, as compared to those required in connection with continuous lay stranding machines.

The prior art suggests a considerable variety of stone sawing strand constructions; the following patents, issued in the United States (except in the instance noted), are exemplary:

A three-wire stone cutting saw is taught in Wienholz U.S. Pat. No. 2,123,619, wherein the wire elements may be triangular, diamond shaped, or flat rectangular strips. The wires may be given a secondary twist, with a pitch that is relatively long in comparison to that of the primary twist.

The stone sawing strand disclosed in Dessureau et al U.S. Pat. No. Re. 24,660 is comprised of two wires of half square/half round cross sectional configuration. The patentees indicate that the twist may be reversed at intervals, and that such is a common practice.

Stevens U.S. Pat. No. 2,876,761 discloses a helicoidal saw wire consisting of a metal strip, which has a portion of reduced thickness intermediate its side edges.

A diamond coated wire saw, made from a braid of wires, is disclosed in Barron U.S. Pat. No. 3,150,470.

Horton teaches, in U.S. Pat. No. 3,180,687, a structure for enlarging the kerf in a rock body, utilizing a sizing saw consisting of a plurality of elongated sections of progressively larger cross-sectional dimensions.

A wire sawing strand comprised of substantially elliptical wires, which is made by compressing a pair of twisted round wires, is described in Joy U.S. Pat. No. 3,257,792.

Thakus U.S. Pat. No. 4,015,931 also discloses a wire saw made by mechanically reworking the cross-sectional configuration of the component strands; in FIG. 5, strands originally of square cross-section are shown.

French patent No. 1,160,447 discloses a stone saw, which may evidently be comprised of square wires.

In the Winter, 1980 edition of BARRE LIFE (published by the Barre Granite Association of Barre, Vt.) is found an article describing the use of steel cutting wire to saw quarry blocks into slabs.

Despite the foregoing, a need remains for a stone sawing strand, and saw produced therefrom, which is capable of highly effective and accurate cutting action, and which can be produced in a manner that is easier, faster, and less expensive than has heretofore been possible.

Accordingly, it is a broad object of the present invention to provide a stone sawing strand which is highly effective and accurate in its cutting action, and which can be produced with greater facility, at increased rates, and at substantially lower cost than have heretofore been possible for the manufacture of comparable products.

It is a more specific object of the invention to provide such a strand wherein the component wires can be helically wound together in a continuous, unidirectional lay, thereby obviating any need for reversal of the stranding machine to provide a saw structure capable of producing a straight kerf through the stone.

Additional specific objects of the invention are to provide a novel stone sawing strand which is relatively light in weight and durable, and has high grit-carrying capacity, thereby permitting high-speed operation and increased output, with reduced power consumption and materials utilization.

It is a further object of the invention to provide a novel method for the production of a stone sawing strand having the foregoing features and advantages, which method enables the utilization of a relatively high-speed and lightweight stranding machine for improved productivity and lower power consumption.

Yet another object of the invention is to provide a novel stone cutting saw produced from the strand and by the method of the invention.

SUMMARY OF THE INVENTION

It has now been found that certain of the foregoing and related objects of the invention can readily be attained by the provision of a stone sawing strand comprised of a helical assembly of a plurality of component wires twisted together in a continuous, unidirectional helical lay. At least two of the wires present on the exterior of the strand will be of non-circular cross-section and twisted about their own axes, the twist direction of one of the component wires being opposite to that of the other.

Other objects of the invention are attained by the provision of a stone saw comprised of a continuous loop of the foregoing stone sawing strand, and additional objects are attained by the provision of a method for the production thereof. In the method, the following steps are carried out: a. twisting a first wire of non-circular cross-section in a right-hand direction about its longitudinal axis; b. twisting a second wire of non-circular cross-section in a left-hand direction about its longitudinal axis; and c. continuously twisting the first and second wires together in a unidirectional helical lay. Preferably, a bow stranding machine is employed in the practice of the method.

DETAILED DESCRIPTION OF THE ILLUSTRATED EMBODIMENTS

Figure 1:
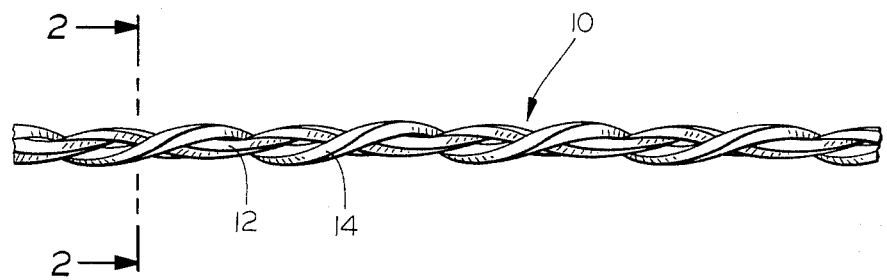
FIG. 1 of the drawing is a fragmentary elevational view of a length of stone sawing strand embodying the present invention.
Figure 2:
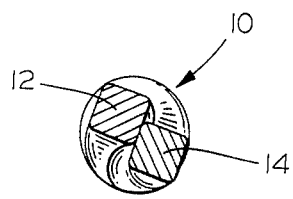
FIG. 2 is a cross-sectional view of the strand of FIG. 1, taken along line 2—2 thereof and drawn to an enlarged scale.

Turning now in detail to FIGS. 1 and 2 of the appended drawing, therein illustrated is a length of stone sawing strand embodying the present invention. As can be seen, the strand, generally designated by the numeral 10, consists of two wire components 12, 14, each of square cross-sectional configuration, twisted or wound together into a helical assembly. Prior to such assembly, one of the component wires (e.g. 12) is twisted in a right-hand direction about its own axis, and the other wire 14 is similarly twisted in a left-hand direction.

Figure 3:
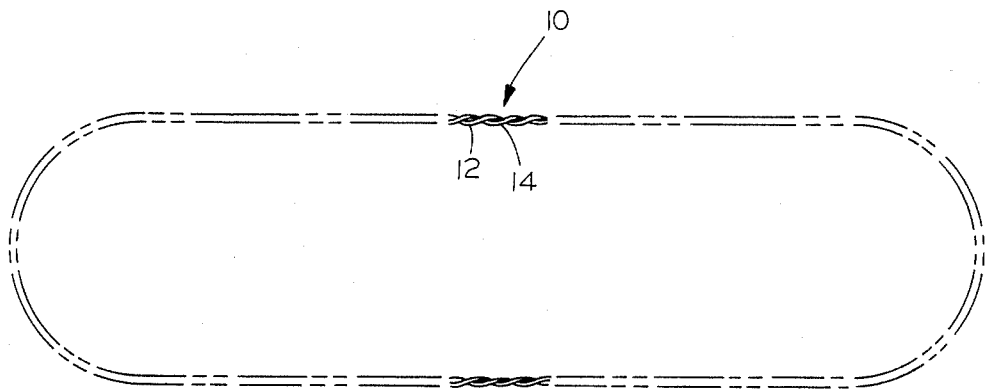
FIG. 3 is a fragmentary elevational view of a stone saw produced from the strand of FIGS. 1 and 2, and embodying the present invention.

The saw of FIG. 3 consists of a long piece of the strand 10 of FIGS. 1 and 2, formed into a continuous loop by connecting the opposite ends, such as by a butt welding technique. The shape of the loop illustrated is generally that which it will assume in the sawing machine.

Normally, cold or hard-drawn high carbon steel wires will be used in the strand. As indicated above, the strand will usually consist of two wires, but in some instances it may be preferable to utilize more; generally, the maximum practical number will be four. In any case, it is fundamental to the present invention that at least two of the wires be of non-circular cross-section, and that at least one of them have an axial twist opposite to another. It is of course necessary that both of these component wires be exposed on the exterior surface of the strand for effective contact with the stone and to function as the carrier for the abrasive slurry. It may, however, also be desirable to construct the strand with a core wire that is not so exposed, which may be round and/or untwisted.

In further regard to the shape of the component wires, most advantageously they will be of square cross-sectional configuration, such as the proprietary spiral wire product that is commercially available from IVACO Corporation of Montreal, Canada. However, other non-circular wire shapes may be employed, such as oval, triangular and rectangular, and wires of different cross-sections may be combined into a single strand, if so desired.

When a square wire is utilized, it will normally have a dimension of about 0.120 to 0.130 inch on a side, and comparable dimensions will typically be utilized for wires of other shapes; the nominal overall diameter of the helical strand assembly will generally be about ⅛ to 9/32 inch. Actual dimensions will of course depend upon the number of wires in the assembly, their cross-sectional configuration and gauge, etc., and deviation from the foregoing dimensions may of course occur without departing from the scope of the present claims. The lay length or pitch of the individual wires, and of the strand, will usually be about 0.8 to 2.0. and 0.85 to 1.25 inches, respectively, after being drawn to their ultimate condition.

As explained above, it is fundamental to the invention that the strand be helically wound or twisted continuously and in one direction. This is believed to be in clear contrast to stone saws commonly available on a commercial basis, which are generally constructed with a periodic reversal of the lay direction, as previously discussed. It is the need to reverse the lay direction which renders the manufacture of the conventional stone sawing strand expensive and relatively slow. The avoidance thereof enables advantage to be taken, on a practical industrial basis, of the high speed capability of the relatively lightweight stranding machines known in the art, such as the so-called "bow strander" described in U.S. Pat. No. 3,557,540 to Martinez and commercially available, under the trade designation FLO-MACH, from the Florida Wire and Cable Company of Jacksonville, Fla. It should be appreciated, however, that tubular stranding machines can be used to produce the strand of the invention, if preferred for some reason. Except for the foregoing, manufacture may be accomplished in much the same way that stone sawing strand is conventionally made.

Thus, it can be seen that the present invention provides a stone sawing strand which is highly effective and accurate in its cutting action, and which can be produced with greater facility, increased speed, and at substantially lower cost than have heretofore been possible for the manufacturer of comparable products. The component wires of the strand are helically wound together in a continuous, unidirectional lay, thereby obviating any need for reversal of the stranding machine to provide a saw structure capable of producing a straight kerf through the stone. The strand is relatively light in weight and durable, and has high grit-carrying capacity, permitting high-speed operation and increased output, with reduced power consumption and materials utilization. The invention also provides a novel method for the production of a stone sawing strand having the foregoing features and advantages, which method enables the utilization of a relatively high-speed and lightweight stranding machine for improved productivity and lower power consumption. Finally, the invention provides a novel stone cutting saw produced from the strand and by the method described.

Having thus described the invention, what is claimed is:

1. A stone sawing strand comprised of a helical assembly of a plurality of component wires twisted together in a continuous, unidirectional helical lay, at least two of said wires present on the exterior of said strand being of non-circular cross-section, and each of said two wires being twisted about its own axis in addition to being twisted with the other of said component wires in said helical lay, the direction of axial twist of one of said two wires being opposite to that of the other.

2. The strand of claim 1 consisting of two component wires, one of said wires having a left-hand twist axial and the other of said wires having a right-hand twist axial.

3. The strand of claim 1 wherein each of said two component wires is of square cross-sectional configuration.

4. The strand of claim 3 wherein each of said component wires measures about 0.120 to 0.130 inch on a side.

5. The strand of claim 1 wherein each of said two component wires has a twisted lay length of about 0.8 to 2.0 inches.

6. The strand of claim 1 wherein said helical lay length of said strand is about 0.85 to 1.25 inch.

7. The strand claim 1 wherein said component wires are fabricated from cold drawn steel.

8. A a stone saw, a continuous loop of stone sawing strand comprised of a helical assembly of a plurality of component wires twisted together in a continuous, unidirectional helical lay, at least two of said wires present on the exterior of said strand being of non-circular cross-section, and each of said two wires being twisted about its own axis in addition to being twisted with the other of said component wires in said helical lay, the direction of axial twist of one of said two wires being opposite to that of the other.

9. In a method for the production of a stone sawing strand, the steps comprising:
   a. twisting a first wire of non-circular cross-section in a right-hand direction about its longitudinal axis;
   b. twisting a second wire of non-circular cross-section in a left-hand direction about its longitudinal axis; and
   c. continuously twisting said first and second wires together in a unidirectional helical lay.

10. The method of claim 9 wherein said wires are of square cross-sectional configuration, the lay length of wire twist produced in both of said steps "a" and "b" being about 0.8 to 2.0 inches, and said helical strand lay length being about 0.85 to 1.25 inches.

11. The method of claim 9 wherein said step of unidirectional twisting together of said first and second wires is effected on a bow stranding machine.

* * * * *

UNITED STATES PATENT AND TRADEMARK OFFICE
CERTIFICATE OF CORRECTION

PATENT NO. : 4,580,545
DATED : April 8, 1986
INVENTOR(S) : Victor A. Dorsten

It is certified that error appears in the above-identified patent and that said Letters Patent is hereby corrected as shown below:

Column 5, lines 27-29 (Claim 2, lines 2-4), invert the words "twist" and "axial" at both locations.

Signed and Sealed this

Second Day of September 1986

[SEAL]

Attest:

Attesting Officer

DONALD J. QUIGG

Commissioner of Patents and Trademarks